United States Patent

Ma

[11] 3,859,400
[45] Jan. 7, 1975

[54] METHOD FOR INJECTION MOLDING MACHINE AUTOMATIC CONTROL

[75] Inventor: Carlton Y. W. Ma, Cincinnati, Ohio

[73] Assignee: Cincinnati Milacron, Inc., Cincinnati, Ohio

[22] Filed: Jan. 11, 1974

[21] Appl. No.: 432,677

[52] U.S. Cl.................. 264/40, 264/328, 425/145
[51] Int. Cl............................................. B29f 1/06
[58] Field of Search ....... 264/328, 40; 425/149, 145

[56] References Cited
UNITED STATES PATENTS

| | | | |
|---|---|---|---|
| 3,628,901 | 12/1971 | Paulson.......................... | 264/328 X |
| 3,642,404 | 2/1972 | Nagawa............................ | 425/145 |
| 3,767,339 | 10/1973 | Hunkar............................ | 425/145 |
| 3,799,719 | 3/1974 | Bonikowski....................... | 264/40 |

Primary Examiner—Richard R. Kucia

[57] ABSTRACT

A method for injection molding machine automatic control to switch from the injection to the packing phase automatically in response to a signal representative of the time interval for the injection phase or of the ram position at the end of the injection phase. This is an iterative system meaning that correction and switching signals are obtained in a first shot but not used until the next succeeding shot when the switching signal is used to automatically switch and is employed as the reference signal for preparation of the switching signal on the next shot.

8 Claims, 5 Drawing Figures

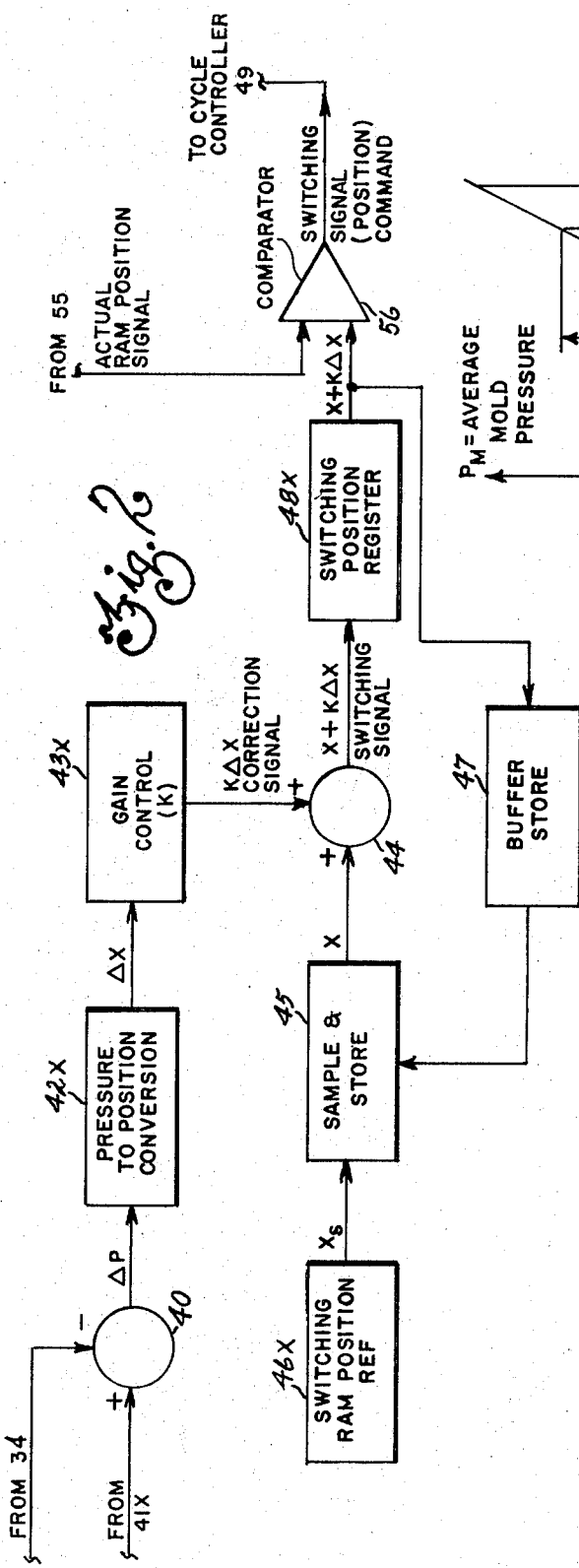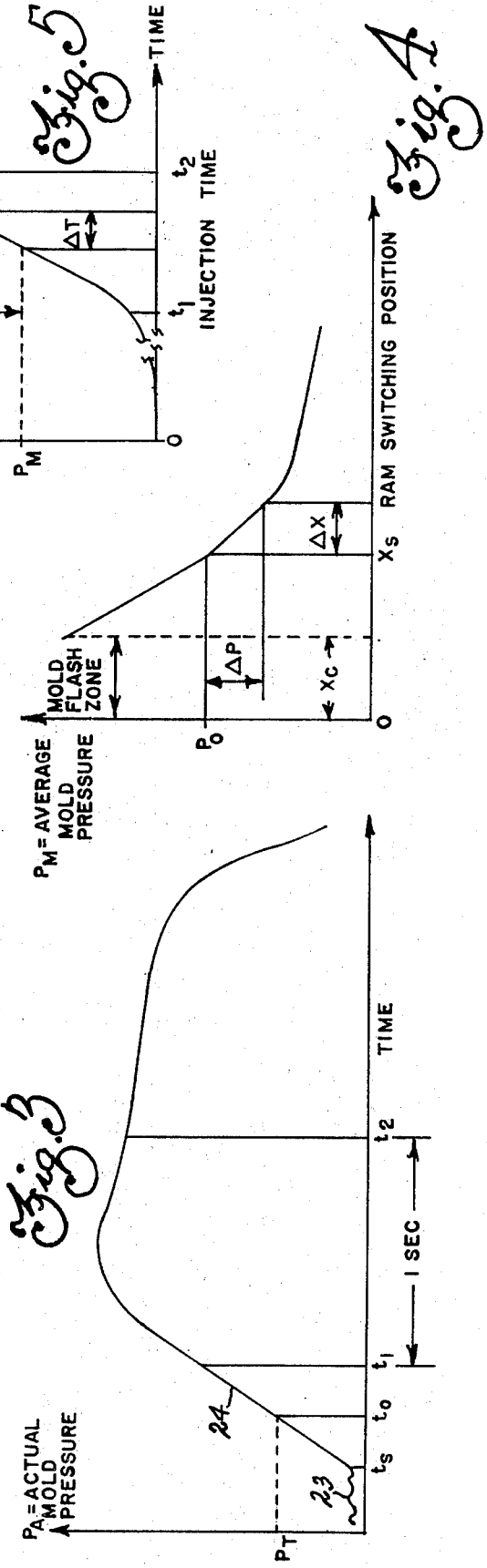

METHOD FOR INJECTION MOLDING MACHINE AUTOMATIC CONTROL

SUMMARY OF BACKGROUND OF THE INVENTION

This invention relates to an improved method for injection molding machine automatic control. One aspect is the use of an event of the injection molding cycle to command and cause the switching from injection to packing phase. One aspect of the invention relates to such method where the injection phase time is used as the base or reference event. One aspect of the method is the employment of ram position as a reference or base event. This invention is particularly well adapted to automatic control of plastic injection molding machines having a hydraulically powered ram reciprocated inside a barrel, in connection with which the invention will be described.

Producing consistent and uniform parts has been a troublesome problem in injection molding process. The problem in recent times has become more pronounced with the increase in employment of plastics for a wide range of things used in every day life by millions of people. This has required injection molding machines capable of making long production runs with minimum attention and minimum manual adjustments to accommodate various operating condition changes. Among the factors effecting parts consistency and uniformity are the plastic itself, shot size, melt viscosity, cycle rate, mold (cavity) pressure, and injection pressure.

The present invention involves indirectly controlling conditions which in turn effect the cavity or mold pressure. The present invention involves automatically controlling when the machine cycle is switched from injection to packing phase. It is preferred to do this one of two ways; namely, by controlling the time interval required for injection before such switching or by controlling the ram position at which such switching takes place.

The aforesaid switching is achieved by controlling the hydraulic ram pressure in response to a switching signal that is based on either the time or position reference already noted. The switching signal is obtained by measuring mold pressure, converting same to either a time or position base to produce a correction signal, adding the correction signal to a switching reference signal that is stored in the control system and represents the reference switching event, and then on the next succeeding shot (keeping in mind that this is an iterative system) using the switching signal thereby obtained to regulate the hydraulic pressure on the ram and the quantity of hydraulic liquid delivered to it in such a manner that no further ram advance takes place, but that the ram is held still to keep pressure on the plastic in the mold whereby the packing phase is entered into at that time.

Advantages realized by this type of control system are increased parts dimensional uniformity through minimizing parts shrinkage, minimizing mold flash and minimizing short shots. Other objects advantages and features of the invention would become apparent from a reading from the following drawings in connection with this specification and claims. Wherein:

FIG. 2 is a schematic diagram of a modification of the invention;

FIG. 3 is a graph showing a typical time-actual mold pressure curve;

FIG. 4 shows a representative pertinent portion of a ram position — average mold pressure curve and relates to the FIG. 2 embodiment; and FIG. 5 shows a representative pertinent portion of a switching time average mold pressure curve and relates to the FIG. 1 embodiment.

Figure 1:
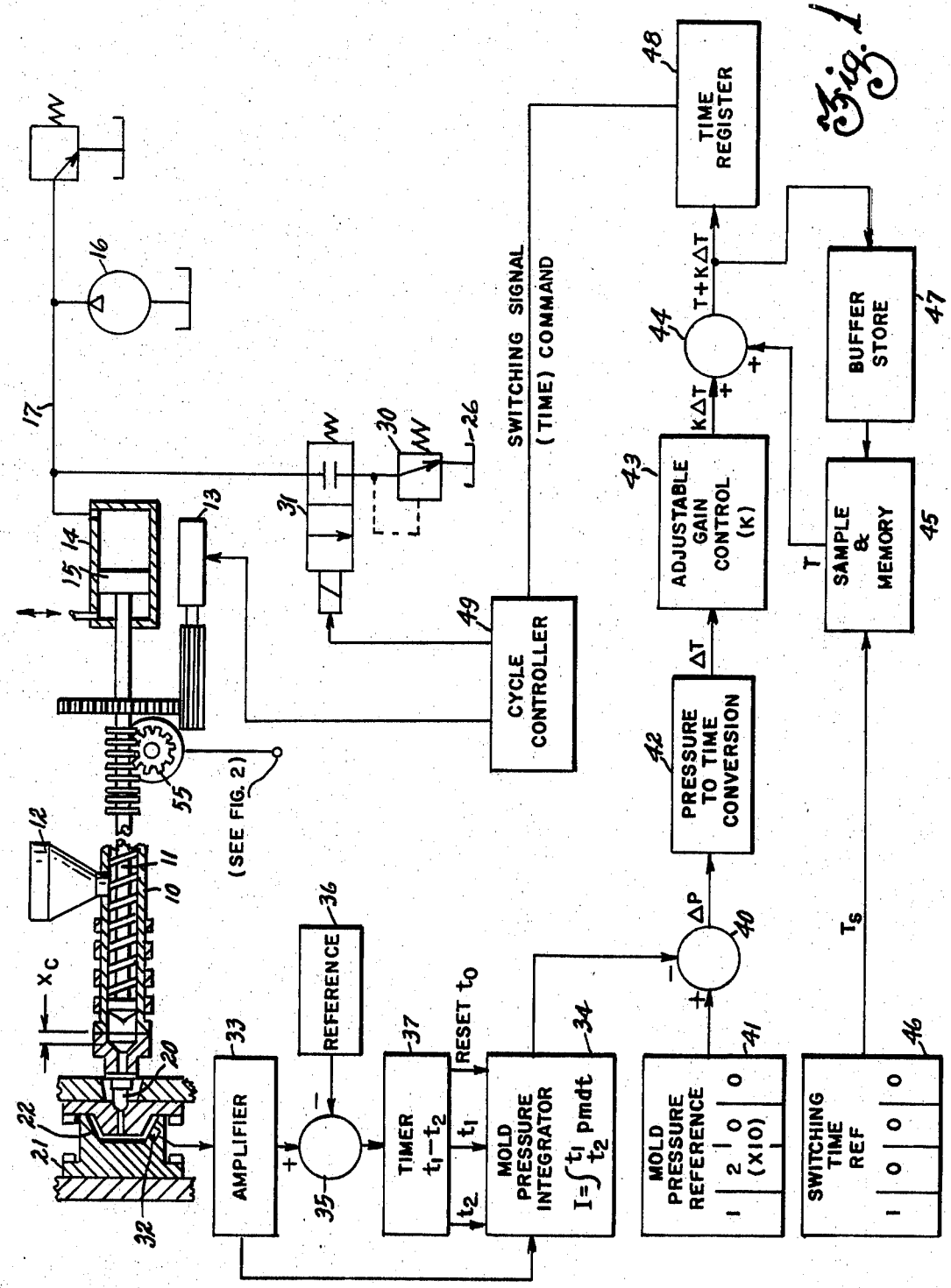
FIG. 1 is a schematic diagram of one embodiment of the invention.

Apparatus common to the systems of FIG. 1 and FIG. 2 is shown and described in copending United States application Ser. No. 358,839 filed May 10, 1973, and of which I am a co-inventor.

DESCRIPTION OF PREFERRED EMBODIMENT OF FIG. 1

The present invention is practiced by the injection molding apparatus illustrated schematically in FIG. 1 wherein a barrel 10 housing a screw or ram 11 receives molding compound from a hopper 12. Rotation of the screw by a motor 13 causes the molding compound to be fed to the forward end of the barrel where is accumulates in front of the screw as the latter is forced rearwardly against back pressure provided by a cylinder 14. The cylinder contains a piston 15 mounted on the rear end of the screw 11 and is supplied with hydraulic pressure from a source 16 (e.g., a hydraulic pump) through a line 17.

At its forward end the barrel terminates in a nozzle 20 which fits into the sprue or gate of a mold 21 having a cavity 22 formed therein. When the screw 11 reaches a predetermined rearward position (to the right as shown in FIG. 1) representing the required shot size, injection pressure is applied to the cylinder 14 and piston 15 thereby propelling the screw forwardly in the barrel and injection the plasticized compound into the mold.

This portion of the cycle (injection phase) is represented by the left-hand part 23 of the curve (FIG. 3) which indicates the build up of actual mold (cavity) pressure ahead as the screw moves forward (to the left in FIG. 1). The pressure in the mold cavity remains very low — for practical purposes approximately zero (although FIG. 3 for illustrative purposes exaggerates the mold pressure during this, the injection phase) — until the cavity is filled at time $t_s$ (FIG. 3). The injection phase ends at the time $t_s$ by switching to a ram pressure holding operation. At about the time of switching, ordinarily afterwards, the actual mold pressure in cavity 22 rises and is held by the holding pressure applied by the screw until the gate freezes. The screw is biased toward the mold by hydraulic pressure applied to the piston 15 at the distal end of the screw.

After switching has occurred at time $t_s$ (FIG. 3), there is a very rapid rise in actual cavity pressure indicated by portion 24 of the pressure-time curve. When the actual pressure levels out at some higher range, factors other than injection have taken over such as the maintenance of packing pressures (this now being the packing phase), cooling effects, etc. Other events noted in FIG. 3 which will be described further below are the turning on of a pressure operated time at $t_0$, the actual beginning of pressure measurements responsive to the timer at $t_1$ and the termination of pressure measurement at $t_2$.

The pressure in the mold cavity is sensed by a transducer 32 and the low level signal therefrom is amplified at 33 and then delivered to an integrating circuit 34.

The output of amplifier 33 is also passed to a comparator circuit 35 where it is compared with a threshold reference signal derived from a source 36. The output of the circuit 35 occurs at time $t_0$ which initiates at delay timer 37 which gates the timer 37 on whenever the comparator output is both above the threshold pressure level $P_T$ and is positive. The timer 37 operating signal is set to operate if and only if the low pressure in the mold passes through the threshold $P_T$, say 100 psi: and so prevents operation of the timer 37 if any blockage occurs in the nozzle or the sprue which prevents pressure build up to $P_T$ in the mold. Timer 37 resets itself for each cycle.

Starting of the timer is indicated at $t_0$ in FIG. 3 and at this time, a reset signal is transmitted from the timer to the integrator 34 to set it to zero. After a sufficient time has elapsed (from $t_0$ to $t_1$) to permit the pressure in the mold to rise substantially above its minimum or injection value 23, the timer 37 at time $t_1$ transmits a signal to the integrator 34 to begin integration, i.e., summation, of the actual mold pressure. After a further interval of time has elapsed, but before the mold pressure has dropped significantly, due to curing of the part in the mold, the timer transmits a further signal to the integrator to stop the integration process: the time when this occurs is indicated at $t_2$ in FIG. 3.

It is stressed that the average (or integrated) pressure $P_M$ of FIGS. 4 and 5 is not the same as the actual pressure of FIG. 3. The average (integrated) mold pressure $P_M$ values of FIG. 5 represent the area under the FIG. 3 curve divided by the time interval $t_2 - t_1$. Due to operation of the threshold and timer 36, 37 only the portion of the FIG. 3 curve between $t_1$ and $t_2$ is of interest and needs to be plotted in FIG. 5 so that the pressure time conversion (below) can be arrived at. Similarly for the pressure ram switching position curve of FIG. 4 where the average or integrated pressure curve rises as the screw 11 moves to the left from its retracted position at the right of FIG. 1 toward $X_C$ the cushion (see below) or most advanced ram position. Expressed mathematically for FIG. 1 embodiment (and relating to the nomenclature of FIG. 5 to FIG. 1):

$$P_M = \frac{1}{t_2 - t_1} \int_{t_1}^{t_2} P_A \, dt$$

which can be and is simplified in practice by selecting a time interval $t_2 - t_1 = 1$ unit of time whereupon $$P_M = \int_{t_1}^{t_2} P \, dt.$$

The same is true for the FIG. 2 embodiment and the relation of FIG. 4 to FIG. 1.

At the conclusion of the integrating operation (FIG. 1) the signal representing the integral (or average) of the mold pressure from $t_1$ to $t_2$ is transmitted to a differential amplifier circuit 40 where it is compared with a mold pressure reference signal obtained from a source 41 which source preferably is manually adjusted to the desired holding pressure within the mold cavity to produce a pressure difference signal $\Delta P$. Circuit 40 subtracts the integrator 34 output signal from the reference signal 41 to get a difference signal $\Delta P$ having both magnitude and polarity. The difference signal $\Delta P$ is introduced into a pressure-time conversion circuit 42 which multiplies the difference signal $\Delta P$ by a factor representing (as illustrated in FIG. 5) a representative time interval $\Delta T$ that is required for a differential pressure rise $\Delta P$ to occur during the rapid pressure rise illustrated as 24 on the FIG. 5 curve. This factor is thus $\Delta T / \Delta P$. The time signal thus obtained is then passed into gain control 43 which multiplies the time signal by constant K for loop gain adjustment purposes. Preferably gain control 43 is adjustable to allow tuning the circuit whereby optimum correction time and quality can be achieved. The signal produced by the gain control 43 is called herein a correction signal and is shown on FIG. 1 as $K\Delta T$.

The correction signal $K\Delta T$ is algebraically added to a reference signal in summing circuit 44. The reference signal represents a switching time signal which is initially set in at the reference 46 and transmitted through sample and memory circuit 45 to the summing circuit 44. Thus, on the first iteration the summing circuit 44 algebraically adds the time correction signal $K\Delta T$ to the time T required for switching from the previous circuit.

A switching signal $T + K\Delta T$ is the output from the summing circuit 44 (on the first iteration) and is provided to two different storage means. One is a time register 48 and the other is a buffer store 47 that is in the feedback circuit. The time switching register 48 releases the switching signal on the very next cycle so that the switching time $T_{sw}$ in the very next cycle equals $T + K\Delta T$. The buffer store and sample and memory feedback circuits 45, 47 release the $T + K\Delta T$ signal in a timed fashion so that it is used as the time reference signal from 46 (on the next cycle). Thus on the second iteration $T + K\Delta T_1$ is algebraically added to $K\Delta T_2$ that is obtained in the second (i.e. next succeeding) cycle to create the next succeeding switching time signal $T + K T_1 + K T_2$ that will be stored and then delivered out of the time register 48 into the cycle controller 49 and the hydraulic control system 30, 31.

Thus on subsequent iterations the summing circuit 44 output signal may be represented as $$T + K \sum_{0}^{n-1} \Delta T_{n-1}$$

where $n$ is the number of iterations in which case the switching time reference is ignored but the sample and memory 45 signal is also $$T + K \sum_{0}^{n-1} \Delta T_{n-1}$$

from the previous interation.

When the cycle controller 49 transmits a control signal to the solenoid of the hydraulic valve 31 which then bypasses additional fluids through pressure control valve 30 to the reservoir 26 from the hydraulic pump or other pressurized fluid source 16 to maintain the pressure in the hydraulic cylinder 14 at a level suitable to keep packing pressure in the mold but insufficient to advance the ram any further. When the packing phase has been completed, the part has cooled sufficiently to permit its removal from the mold, the packing phase is ended and the cycle controller orders other events, not here pertinent but which are well-known in the art, which open the mold and remove the parts therefrom.

It will thus be seen that the switching signal provided to the time register 48 is also fed back for use as a reference signal in the next succeeding injection cycle. It thus serves to regulate the switching time of the next cycle and is itself corrected in a similar manner.

DESCRIPTION OF FIG. 2 EMBODIMENT

The embodiment of FIG. 2 proceeds on the basis (illustrated in FIG. 4) that a definite change in mold pressure occurs for a given change in ram switching position during the injection phase. The FIG. 2 circuit is connected to the outputs from 34 and 41 (called 41X — see below), to the output from potentiometer 55 (not used in FIG. 1), and feeds its output signal from 56 to the cycle controller 49, in lieu of the elements of FIG. 1 between those points. It is emphasized that FIG. 4 shows on its X axis the position of the ram when stopped at which time switching occurs from injection to packing. That is, when the ram stops its advance toward the mold the Y axis of FIG. 4 shows the average or integrated mold pressure during a selected portion of the packing phase after switching has occurred. FIG. 4 also illustrates typically how mold pressure difference P is affected by a change in ram switching position $\Delta X$. Also FIGS. 1 and 4 show $X_c$ representing the ram position at minimum cushion shot volume: cushion shot concepts are explained in U.S. Pat. No. 3,666,141 of which I am a co-inventor.

The modification of the automatic control system as illustrated in FIG. 2 operates on the principle suggested by FIG. 4 that using of the ram position as a switching event can be used to control the mold pressure. The average mold pressure is obtained in an integrated fashion as before (from elements 32 through 37 inclusive) and compared with a mold pressure reference signal from 41X at the summing junction 40 where the pressure difference signal $\Delta P$ is obtained and provided to the pressure-to-position conversion means 42X which multiplies the signal from 40 by a factor representing the ratio $\Delta X/\Delta P$ as illustrated in FIG. 4 which thereby provide a signal representing position change that has its scale adjusted to yield correction signal $K\Delta X$ at a gain control 43X.

The correction signal $\Delta X$ obtained from the gain control is then provided to a summing means 44 that algebraically adds the correction signal to a switching ram position reference signal $X_s$ obtained from sample and store circuit 45. Initially the operator has set in to the system a switching ram position reference $X_s$ at 46X.

The algebraic sum $X_s + K\Delta X$ obtained at 44 is called a switching signal and is provided to a switching position register 48X which stores it until the next cycle starts when it then provides the signal representing $X + K\Delta X$ to the feedback circuit through the buffer store 47 and sample store 45 and to the comparator 56.

The $X + K\Delta X$ signal at comparator 56 is compared with an actual ram position measurement obtained from a position indicator 55 (see FIG. 1). The position indicator may conveniently be a potentiometer.

When the comparator finds the signal from 55 and that from the switching position register 48X to be equal, the comparator 56 provides a switching signal to the machine cycle controller 49 (see FIG. 1) which operates as before to terminate the injection phase and switch to the packing phase of a cycle. Also, as before, this is iterative in that the ram position correction obtained on a first cycle is used to control the ram position at the instant of switching from injection phase on the next succeeding cycle.

The method of the present invention thus relates to automatically controlling the cycle of an injection molding machine with a hydraulically operated ram for molding plastics by switching from injection phase to the packing phase through controlling the cylinder pressure on the ram to stop substantial ram advancement and to hold the ram at substantially the same position for the packing phase of the cycle and comprises the steps of . . .

measuring (as by integrating, e.g., 32, 34, over a predetermined time interval via timer 37 a series of) a mold pressure (such as pressures responding to an injection stroke of the ram) and producing responsive thereto a signal representative of such (e.g. integrated) pressures;

comparing such a signal with a reference signal that represents a reference mold (e.g. integrated) pressure value (from 41) and producing (42, 42X, 43, 43X) a correction signal that is on the same scale as the referenced switching event noted below ($\Delta P$ producing $K\Delta T$ or $K\Delta X$);

adding said correction signal to a switching reference signal that is representative of a referenced switching event (T, X) of the present cycle to form a switching signal ($T + K\Delta T$ or $X + K\Delta X$) that is representative of the switching event of the next succeeding cycle;

storing said switching signal until said next cycle;

transmitting said stored switching signal during said next cycle to means for controlling ram back pressure 49, 31; and responsive to such transmitting maintaining the ram cylinder pressure substantially constant for a time sufficient to substantially complete the packing phase; and during said next cycle supplying said switching signal as said switching reference signal.

What is claimed is:

1. A method of automatically controlling the cycle of an injection molding machine with a hydraulically operated ram for molding plastics to switch from injection phase to the packing phase by controlling the cylinder pressure on the ram to stop substantially ram advancement and to hold the ram at substantially the same position for the packing phase of the cycle comprising the steps of . . .

measuring mold pressure and producing a signal representative of mold pressure;

comparing such signal with a reference signal that represents a reference mold pressure to produce a correction signal;

adding said correction signal to a switching reference signal that is representative of a referenced switching event of the present cycle to form a switching signal that is representative of the switching event of the next succeeding cycle;

storing said switching signal until said next cycle;

transmitting said stored switching signal during said next cycle to means for controlling ram cylinder pressure;

responsive to such transmitting maintaining the ram cylinder pressure substantially constant for a time sufficient to substantially complete the packing phase; and during said next cycle supplying said switching signal as said switching reference signal.

2. The method of claim 1, wherein said adding step includes providing a switching reference signal that is representative of the time interval of the injection phase stroke of the ram.

3. The method of claim 1, wherein said adding step includes providing a switching reference signal that is representative of the position of said ram at about the time when the injection phase is to be switched to the packing phase.

4. The method of claim 3, wherein said transmitting step is initiated in response to the ram reaching a position and generating thereby a ram position signal that is at least about equal to or greater than said switching signal.

5. A method according to claim 1, wherein said measuring and comparing steps respectively comprise . . .
measuring and integrating over a predetermined time interval a series of pressures of an injection stroke of the ram and producing responsive thereto a signal representative of such integrated pressures;
comparing such signal with a reference signal that represents a reference integrated pressure value to produce a correction signal.

6. The method of claim 5, wherein said adding step includes providing a switching reference signal that is representative of the time interval of the injection phase stroke of the ram.

7. The method of claim 5, wherein said adding step includes providing a switching reference signal that is representative of the position of said ram at about the time when the injection phase is to be switched to the packing phase.

8. The method of claim 7, wherein said transmitting step is initiated in response to the ram reaching a position and generating thereby a ram position signal that is at least about equal to or greater than said switching signal.

* * * * *